US011014731B2

(12) United States Patent
Habitz

(10) Patent No.: US 11,014,731 B2
(45) Date of Patent: May 25, 2021

(54) CONTAINER WITH REINFORCED BOTTOM

(71) Applicant: Gateway Plastics, Inc., Mequon, WI (US)

(72) Inventor: Arthur W. Habitz, Milwaukee, WI (US)

(73) Assignee: Gateway Plastics, Inc., Mequon, WI (US)

( * ) Notice: Subject to any disclaimer, the term of this patent is extended or adjusted under 35 U.S.C. 154(b) by 68 days.

(21) Appl. No.: 16/384,398

(22) Filed: Apr. 15, 2019

(65) Prior Publication Data

US 2020/0324955 A1 Oct. 15, 2020

(51) Int. Cl.
*B65D 1/46* (2006.01)
*B65D 81/02* (2006.01)
*B65D 85/30* (2006.01)
*B65D 88/02* (2006.01)

(52) U.S. Cl.
CPC ............... *B65D 81/02* (2013.01); *B65D 1/46* (2013.01); *B65D 85/30* (2013.01); *B65D 88/02* (2013.01); *B29B 2911/14345* (2015.05)

(58) Field of Classification Search
CPC .......... B65D 81/02; B65D 85/30; B65D 1/46; B65D 88/02; B65D 1/18; B65D 1/16; B65D 1/165; B65D 1/14
USPC ........................................................ 220/608
See application file for complete search history.

(56) References Cited

U.S. PATENT DOCUMENTS

| | | | |
|---|---|---|---|
| D204,507 S | 4/1966 | Davis et al. | |
| 3,516,571 A | 6/1970 | Roper et al. | |
| 3,627,170 A | 12/1971 | Pulliam et al. | |
| 3,730,382 A | 5/1973 | Heisler | |
| D232,152 S | 7/1974 | Roper et al. | |
| 3,829,926 A | 8/1974 | Salladay | |
| 3,866,791 A | 2/1975 | Roper et al. | |
| 4,349,119 A * | 9/1982 | Letica | B65D 1/22 220/659 |
| 4,512,493 A | 4/1985 | Von Holdt | |
| 5,292,024 A | 3/1994 | Koefelda et al. | |
| 5,607,075 A | 3/1997 | Burgdorf et al. | |
| 6,126,033 A * | 10/2000 | Suttoni | B65D 1/16 220/604 |
| 6,619,498 B2 | 9/2003 | Von Holdt, Jr. | |
| 7,086,551 B2 | 8/2006 | Von Holdt, Jr. | |
| 7,090,088 B2 | 8/2006 | Von Holdt, Jr. | |
| D590,561 S | 4/2009 | Baltz | |
| 8,833,592 B2 | 9/2014 | Dunn et al. | |
| D771,339 S | 11/2016 | Luburic | |

(Continued)

*Primary Examiner* — Stephen J Castellano
(74) *Attorney, Agent, or Firm* — Foley & Lardner LLP

(57) ABSTRACT

A container is provided. The container includes multiple sidewalls extending in a substantially vertical direction and a bottom wall. The bottom wall includes a central portion, a first curved portion and a second curved portion. The first curved portion includes a first radius of curvature with a first center of curvature located on a first side of the bottom wall of the container, while the second curved portion terminates at the sidewalls and include a second radius of curvature with a second center of curvature located on a second side of the bottom wall of the container. The container further includes multiple reinforcing ribs located on the second side, each of the reinforcing ribs having a minimum height proximate the first curved portion and a maximum height proximate the second curved portion.

19 Claims, 3 Drawing Sheets

(56) References Cited

U.S. PATENT DOCUMENTS

D782,769 S     3/2017 Luburic
9,669,959 B2   6/2017 Luburic

* cited by examiner

CONTAINER WITH REINFORCED BOTTOM

BACKGROUND

The present disclosure relates generally to injection molded containers and more particularly to an injection molded container with a reinforced bottom. Containers for industrial products or consumer goods often undergo rigorous testing to ensure the safety of the products enclosed in the containers as well as the users handling the containers. For example, a common series of drop tests may require a container to withstand a drop from a height of 18 inches or more at a variety of temperatures (e.g., 35° F., room temperature, 145° F.) without damage. At the same time, product manufacturers desire the use of in-mold labeling techniques to create attractive and eye-catching containers for their products. A container optimized for both in-molding labeling and rough handling conditions would therefore be useful.

SUMMARY

One implementation of the present disclosure is a container. The container includes multiple sidewalls extending in a substantially vertical direction and a bottom wall. The bottom wall includes a central portion, a first curved portion and a second curved portion. The first curved portion includes a first radius of curvature with a first center of curvature located on a first side of the bottom wall of the container, while the second curved portion terminates at the sidewalls and include a second radius of curvature with a second center of curvature located on a second side of the bottom wall of the container. The container further includes multiple reinforcing ribs located on the second side, each of the reinforcing ribs having a minimum height proximate the first curved portion and a maximum height proximate the second curved portion.

Another implementation of the present disclosure is a container. The container includes multiple sidewalls extending in a substantially vertical direction and a bottom wall. The bottom wall includes a substantially flat region and a sloped region. The sloped region includes a first curved portion defining an upward slope and a second curved portion defining a downward slope. The second curved portion merges with the sidewalls such that the intersection of the second curved portion and the sidewalls is substantially perpendicular.

Yet another implementation of the present disclosure is a method of fabricating a container. The method includes providing a mold for a container. The container includes multiple sidewalls extending in a substantially vertical direction and a bottom wall. The bottom wall includes a substantially flat region and a sloped region. The sloped region includes a first curved portion defining an upward slope and a second curved portion defining a downward slope. The second curved portion merges with the sidewalls such that the intersection of the second curved portion and the sidewalls is substantially perpendicular. The method further includes filling the mold with a molten material, and upon expiration of a cooling period, removing the container from the mold.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Before discussing further details of the filter disc and the beverage pod assembly and the components thereof, it should be noted that references to "front," "back," "rear," "upper," "lower," "inner," "outer," "right," and "left," and other directions in this description are merely used to identify the various elements as they are oriented in the FIGURES. These terms are not meant to limit the element which they describe, as the various elements may be oriented differently in various applications. Additionally, any dimensions or sizes specified for the filter disc for the beverage pod assembly and/or the components thereof should be interpreted as describing an exemplary embodiment and should not be regarded as limiting. The filter disc and the beverage pod assembly can have any of a variety of shapes and/or sizes in various applications.

Figure 1:
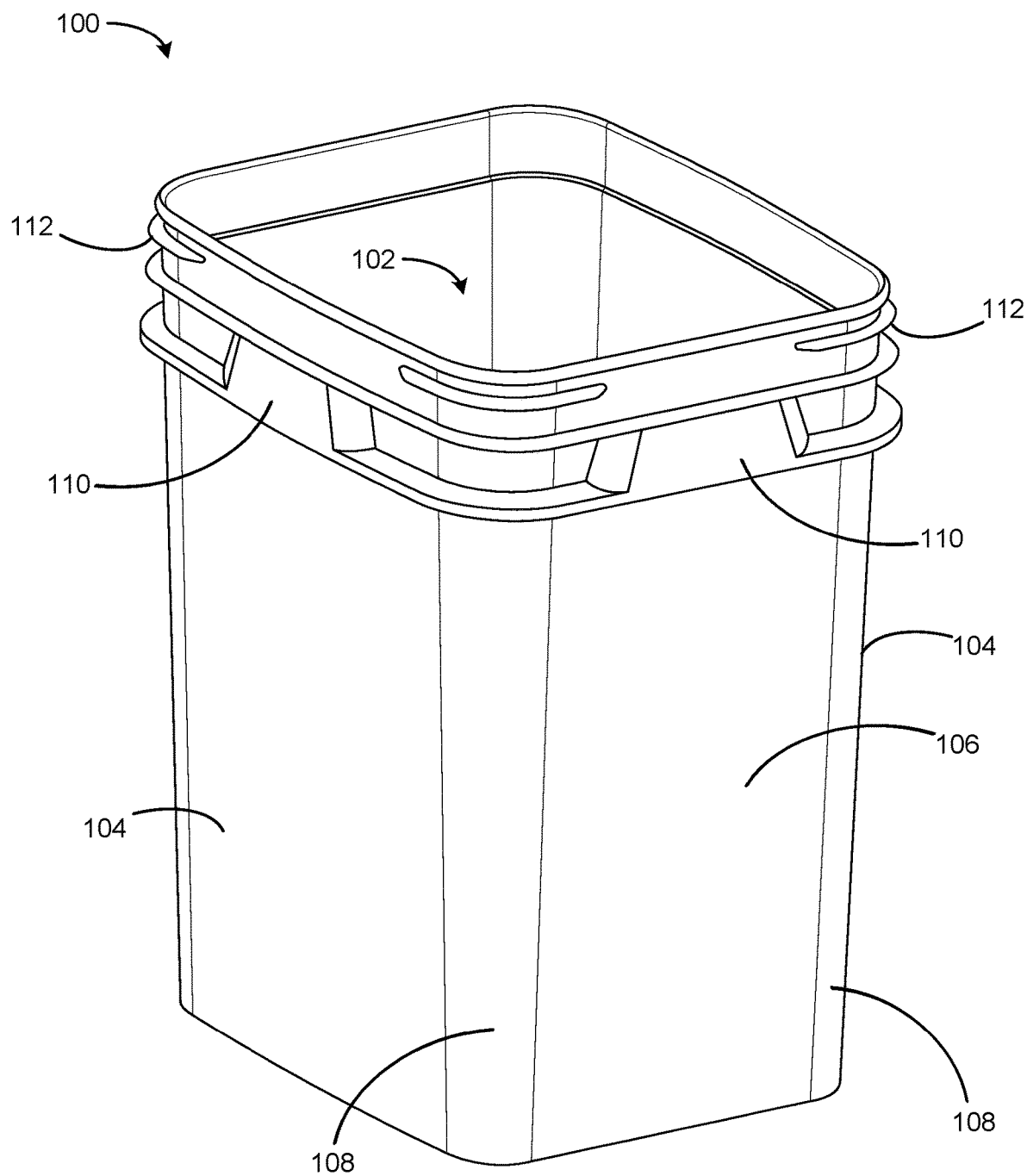
FIG. 1 is a perspective view of a container according to an exemplary embodiment.
Figure 2:
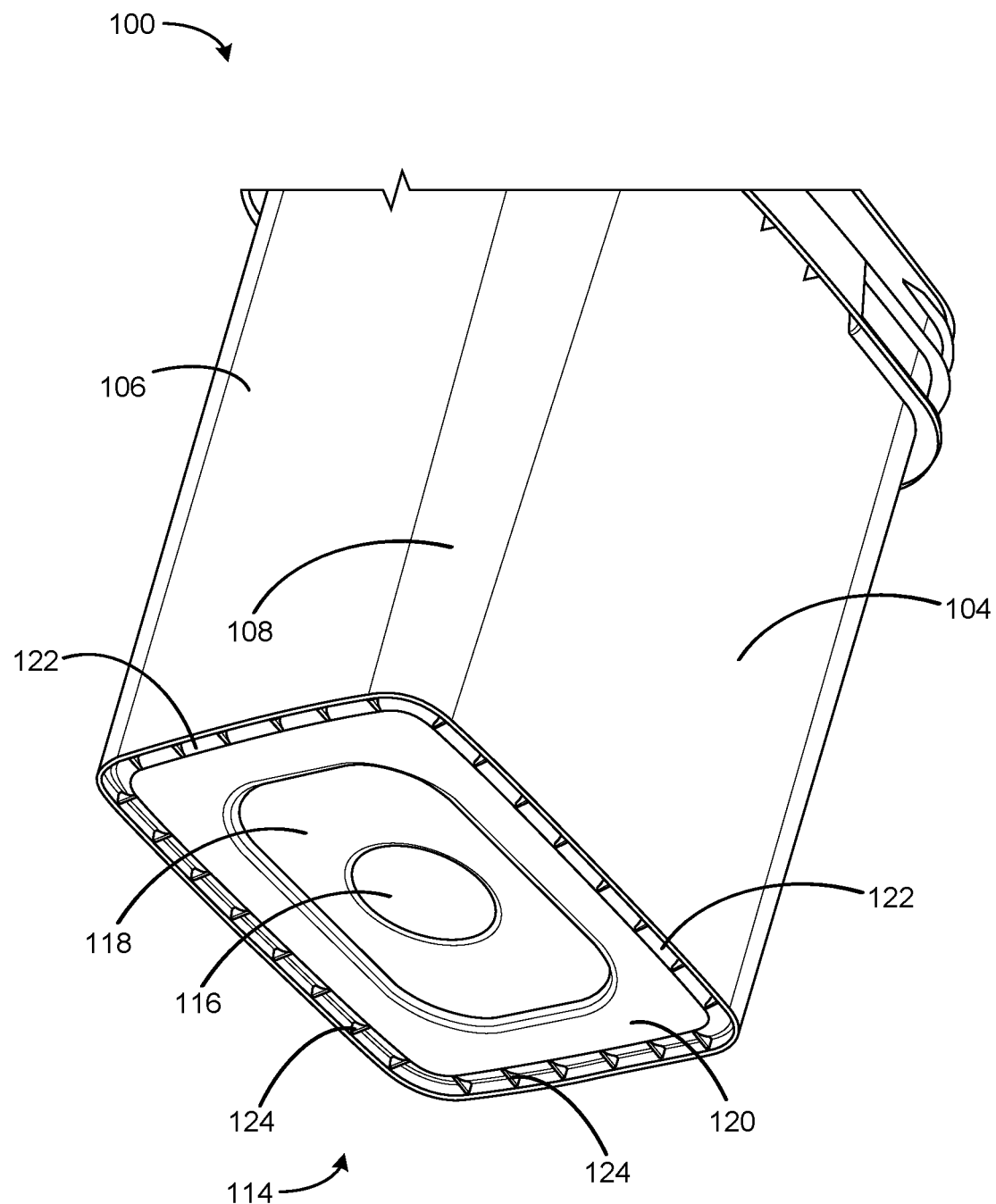
FIG. 2 is a perspective view of the container of FIG. 1 depicting the bottom wall, according to an exemplary embodiment.
Figure 3:
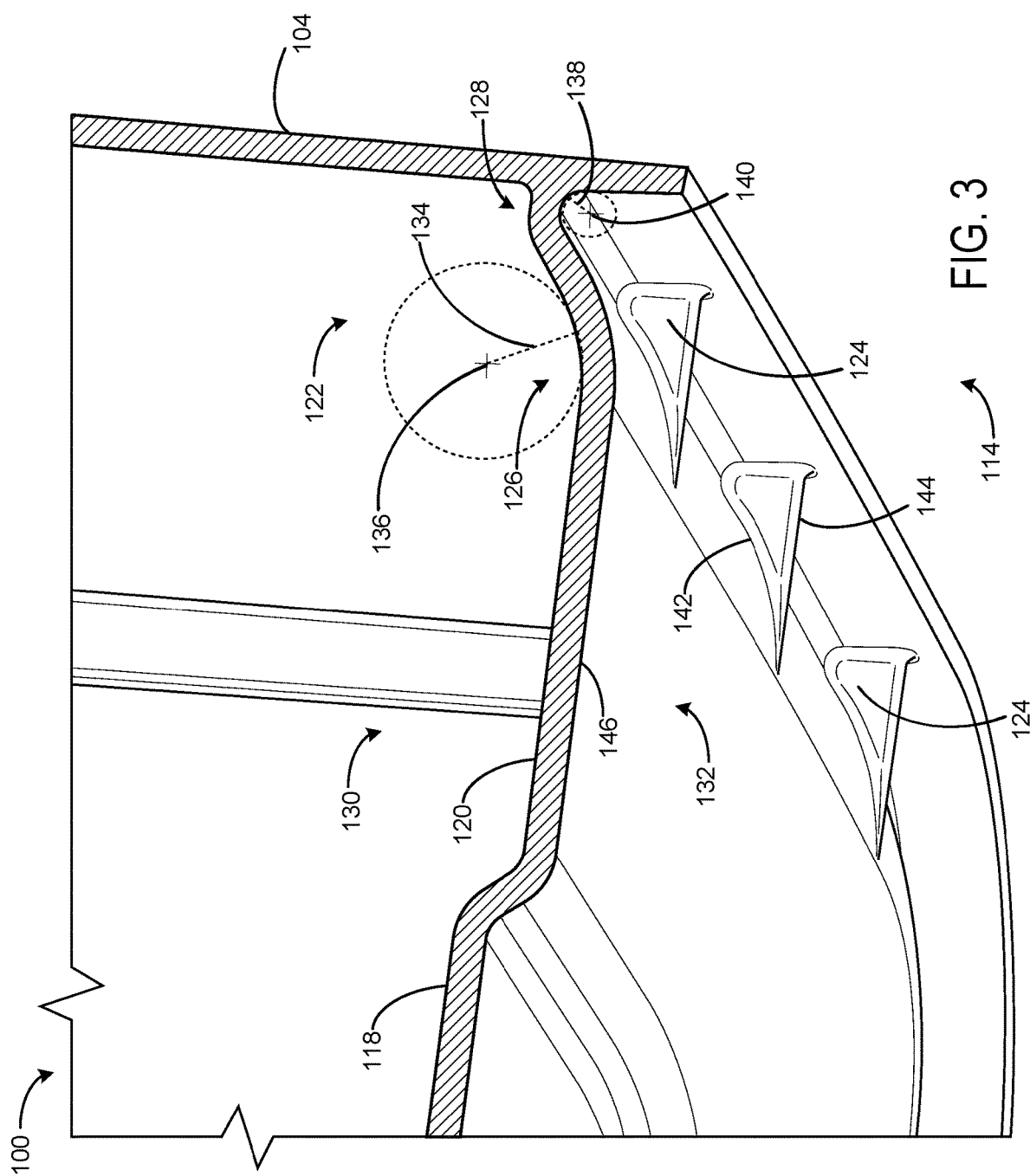
FIG. 3 is a cross-sectional view of the bottom wall of FIG. 2, according to an exemplary embodiment.

FIGS. 1-3 depict a container 100 according to an exemplary embodiment. Referring specifically to FIG. 1, a perspective view depicting the container 100 is shown. Container 100 is configured to define an interior region 102. For example, container 100 may be a drum or a pail used for the transport and storage of solid or liquid industrial products (e.g., paint, cleaning products, solvents, powders). In other embodiments, container 100 may be a package for the transport and storage of a variety of consumer products (e.g., foodstuffs, personal care products, detergents, cat litter). Container 100 may have any overall dimensions (e.g., height, width, diameter, wall thickness) required to suit the characteristics of the product to be filled within the interior region 102. For example, if the maximum volume of the container 100 is approximately 5 gallons, the container 100 may have a maximum height of approximately (i.e., ±0.5 inches) 14.5 inches, a maximum width of approximately 12.0 inches, and a nominal wall thickness of approximately (i.e., ±0.5 inches Container 100 may include multiple sidewalls 104, 106 extending in a substantially vertical direction relative to a plane corresponding with a surface on which the container is located (e.g., a floor, a table, a shelf). Sidewalls 104, 106 may be "substantially" vertical in that they may be exactly perpendicular to the plane, or situated at a draft angle. For example, if the container 100 is formed using a molding process, sidewalls 104, 106 may extend at an outward draft angle ranging from 0.5° to 3.0° to aid in the removal of the container 100 from the molding apparatus. Sidewalls 104, 106 may be joined by corner walls 108. As depicted in FIGS. 1-3, the sidewalls 104, 106 and corner walls 108 may form a container 100 with a substantially rectangular perimeter. In other words, each container 100 may include two sidewalls 104 located opposite each other and two sidewalls 106 located opposite each other, with the length of each sidewall 104 exceeding the length of each sidewall 106. In other embodiments, the lengths of sidewalls 104 and 106 may be equal, such that container 100 has a substantially square perimeter. In still further embodiments, the sidewalls 104, 106 and the corner walls 108 may not be distinct surfaces, but instead may form a continuous surface such that container 100 has a substantially circular or oval-shaped perimeter.

The sidewalls 104, 106 and the corner walls 108 may include various features that aid in the handling of the container 100. As shown in FIG. 1, both sidewalls 104 and 106 may include grip surfaces 110 located near the top of the interior region 102. Grip surfaces 110 may protrude from the sidewalls 104, 106 to permit a user to locate his or her hands between the sidewalls 104, 106 and the grip surfaces 110 in order to grasp the grip surfaces 110 and lift the container 100. In some embodiments, one or more of the grip surfaces 110 may be configured to act as an attachment point for a pail handle (not shown). Although FIG. 1 depicts the container 100 as including grip surfaces 110 on both sidewalls 104 and 106, the container 100 may include any number of grip surfaces 110 having any desired geometry to suit the contents of the container 100. For example, if the container 100 is only a few inches tall and is configured to be filled with a foodstuff, the grip surfaces 110 may be omitted from the container 100. The sidewalls 104, 106 are further shown to include cover retention features 112 situated above the grip surfaces 110. Cover retention features 112 may have any geometry required to permit the coupling of a lid or cover (not shown) and the container 100. For example, the cover may include complementary features to the cover retention features 112 such that the cover may be coupled to the container 100 using a snap fit assembly process.

Referring now to FIG. 2, a perspective view depicting the container 100 including the bottom wall 114 is shown, according to some embodiments. The bottom wall 114 may include a central region with an inner portion 116, an inner surrounding portion 118, and an outer surrounding portion 120. The inner portion 116 is shown to have a substantially circular shape, while the inner surrounding portion 118 is shown to have a rounded rectangular shape. In other embodiments, the inner portion 116 and the inner surrounding portion 118 may have any other desired shape. In some embodiments, the mold for the container 100 is shaped such that the "gate" or injection site through which the molding material flows is situated near the inner portion 116. When the mold includes this geometry, a "vestige" or small lump of material may remain on the inner portion 116 when the container 100 is removed from the mold. Thus, the inner surrounding portion 118 and the outer surrounding portion 120 may be stepped or vertically offset relative to the inner portion 116. This geometry may prevent the inner portion 116 from flexing due to gravity or the weight of the contents of the container 100 and striking a surface on which the container 100 is located (e.g., a floor, a lid of another container 100 if the containers 100 are stacked).

The bottom wall 114 is further shown to include multiple reinforcing ribs 124 distributed in a curved region 122 situated at the outer perimeter of the bottom wall 114. Bottom wall 114 may include any number of reinforcing ribs 124 required to support the sidewalls 104, 106 and corner walls 108 proximate the bottom wall 114. For example, as shown in FIG. 2, container 100 may include eight reinforcing ribs 124 situated below the sidewalls 104 and six reinforcing ribs 124 situated below the sidewalls 106. In some embodiments, the reinforcing ribs 124 may be distributed at regular or semi-regular intervals about the curved region 122. For example, if the container 100 has the rectangular perimeter as shown in FIGS. 1-2, the spacing between adjacent reinforcing ribs 124 situated below the sidewalls 104 may be different than the spacing between adjacent reinforcing ribs 124 situated below the sidewalls 106. In other embodiments, the spacing between adjacent reinforcing ribs 124 situated below the sidewalls 104 may be the same as the spacing between adjacent reinforcing ribs 124 situated below the sidewalls 106. In still further embodiments, the bottom wall 114 may not include any reinforcing ribs 124.

Turning now to FIG. 3, a cross-sectional view depicting the bottom wall 114 of the container 100 in greater detail is shown, according to some embodiments. As described above with reference to FIG. 2, moving outwards from the center of the container 100 to the sidewall 104, the bottom wall 114 is shown to include the inner surrounding portion 118 and the outer surrounding portion 120. In some embodiments, such as the embodiment depicted in FIGS. 2 and 3, the inner surrounding portion 118 and the outer surrounding portion 120 are not coplanar. Instead, the inner surrounding portion 118 may be situated vertically above the outer surrounding portion 120.

The curved or sloped region 122 is shown to include a first curved portion 126 and a second curved portion 128. Again, moving outwardly from the center of the container 100, the first curved portion 126 is shown to slope upwardly and the second curved portion 128 is shown to slope downwardly before merging or intersecting with the sidewall 104. In an exemplary embodiment, the intersection between the second curved portion 128 and the sidewall 104 is substantially perpendicular. When the container 100 is subjected to a drop test, the portion of the sidewall 104 below the second curved portion 128 may be permitted to flex. This flexure prevents energy from driving up the sidewall 104 and across the bottom wall 114, which might otherwise result in fracture. Although the second curved portion 128 is specifically shown to intersect with the sidewall 104, the sloped region 122 may extend around the entire perimeter of the container 100, and thus the second curved portion 128 may intersect with the sidewalls 106 and the corner walls 108 in the same way as the sidewall 104 as depicted in FIG. 3.

In an exemplary embodiment, the first curved portion 126 and the second curved portion 128 slope in opposite directions. Stated differently, the first curved portion 126 has a radius of curvature 134 and a center of curvature 136 located on a first side 130 of the bottom wall 114 (i.e., within the interior region 102, described above with reference to FIG. 1). The second curved portion 128 has a radius of curvature 138 and a center of curvature 140 located on a second side 132 of the bottom wall 114. The second side 132 may be opposite the first wall 130. In an exemplary embodiment, the radius of curvature 134 of the first curved portion 126 is greater than the radius of curvature 138 of the second curved portion 128. In other embodiments, the radius of curvature 138 may be greater than or approximately equal to the radius of curvature 140.

The reinforcing ribs 124 are shown to be disposed below the curved region 122 such that the height of each rib may be at a minimum near the first curved portion 126, specifically near a transition region between the outer surrounding portion 120 and the first curved portion 126. The height of each rib may be at a maximum near the second curved portion 128, specifically near a transition region or intersection between the second curved portion 128 and the sidewall 104. In an exemplary embodiment, a top surface 142 of each of the reinforcing ribs 124 is coincident with the first curved portion 126 and the second curved portion 128, while a bottom surface 144 of each of the reinforcing ribs 124 is substantially coplanar with a bottom surface 146 of the outer surrounding portion 120. In other embodiments, the reinforcing ribs 124 may have any other desired geometry.

In an exemplary embodiment, the container 100 is fabricated from polypropylene (PP) resin using an injection molding process. In other embodiments, a different material (e.g., polyethylene (PE), polyethylene terephthalate (PET), polylactic acid (PLA), high-density polyethylene (HDPE)) may be utilized. The injection molding process may include providing a mold with features configured to form the container 100 and pouring or injecting molten material (e.g., PP resin) into the mold. After a curing or cooling period elapses and the material solidifies, the container 100 may be removed from the mold.

In some embodiments, the container 100 includes one or more labels (not shown). For example, the label(s) may be affixed to one or more of the sidewalls 104, 106 and the corner walls 108. In an exemplary embodiment, the label may be affixed to the sidewalls 104, 106 and the corner walls 108 using an in-mold labeling process. In-mold labeling can provide several advantages over other methods of affixing a label to the container 100, including shorter production times and costs, quick tooling changeover when the label design is updated, good label resistance to humidity and temperature damage, and better container recycling opportunities. In an exemplary embodiment, the in-mold label may be fabricated from a polypropylene voided OPP film, although any suitable label material (e.g., paper, polystyrene) may be utilized. During the molding process, the label is inserted into the mold before injecting the molten material. The label may be retained in a proper position within the mold using a variety of methods, including a static charge, a vacuum, or compressed air. After the molten material has been injected and the curing period has elapsed, the label is inseparable from the formed container.

The features of the bottom wall 114 may aid in the successful completion of an in-mold labeling process. For example, the substantially perpendicular intersection between the second curved portion 128 and the sidewalls 104, 106 and corner wall 108 may drive the sidewalls 104, 106 and the corner walls 108 into the walls of the mold to ensure proper adhesion between the label and the sidewalls 104, 106 and the corner walls 108. The presence of the reinforcing ribs 124 beneath the second curved portion 128 may further aid label adhesion.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

In the present disclosure, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A container comprising:
    a plurality of sidewalls extending in a substantially vertical direction, the plurality of sidewalls terminating at a bottom plane;
    a bottom wall comprising:
        a central region;
        a first curved portion having a first radius of curvature with a first center of curvature located on a first side of the bottom wall; and
        a second curved portion terminating at the plurality of sidewalls, the second curved portion having a second radius of curvature with a second center of curvature located on a second side of the bottom wall opposite the first side; and
    a plurality of reinforcing ribs located on the second side of the bottom wall, each of the plurality of reinforcing ribs having a minimum height proximate the first curved portion and a maximum height proximate the second curved portion, one of the plurality of reinforcing ribs having a bottom surface that is substantially coplanar with an outer surrounding portion of the central region and separated from the bottom plane.

2. The container of claim 1, wherein a top surface of each of the plurality of reinforcing ribs corresponds with the first curved portion and the second curved portion.

3. The container of claim 1, wherein the first radius of curvature is greater than the second radius of curvature.

4. The container of claim 1, further comprising a label inseparably coupled to the plurality of sidewalls using an in-mold labeling process.

5. The container of claim 1, wherein the plurality of sidewalls form a substantially rectangular perimeter.

6. The container of claim 1, wherein an intersection of the second curved portion and the plurality of sidewalls is substantially perpendicular.

7. The container of claim 1, wherein the central region comprises:
   an inner portion; and
   an inner surrounding portion extending entirely around the inner portion and disposed on a first plane; and
   wherein the outer surrounding portion extends entirely around the inner surrounding portion and is disposed on a second plane, the second plane vertically separated from the first plane.

8. The container of claim 7, wherein an upper portion of the second curved portion is disposed on a third plane, the third plane substantially perpendicular to the plurality of sidewalls and vertically separated from the first plane and the second plane.

9. A container comprising:
   a plurality of sidewalls extending in a substantially vertical direction, the plurality of sidewalls terminating at a bottom plane;
   a bottom wall comprising:
      a substantially flat region; and
      a sloped region comprising a first curved portion defining an upward slope and a second curved portion defining a downward slope, the second curved portion merging with the plurality of sidewalls such that an intersection of the second curved portion and the plurality of sidewalls is substantially perpendicular; and
   a plurality of reinforcing ribs disposed beneath the sloped region, one of the plurality of reinforcing ribs having a bottom surface that is substantially coplanar with an outer surrounding portion of the substantially flat region and separated from the bottom plane.

10. The container of claim 9, wherein a top surface of each of the plurality of reinforcing ribs coincides with the sloped region.

11. The container of claim 9, wherein a radius of curvature of the first curved portion is greater than a radius of curvature of the second curved portion.

12. The container of claim 9, further comprising a label inseparably coupled to the plurality of sidewalls using an in-mold labeling process.

13. The container of claim 9, wherein the substantially flat region comprises:
   an inner portion; and
   an inner surrounding portion extending entirely around the inner portion and disposed on a first plane; and
   wherein the outer surrounding portion extends entirely around the inner surrounding portion and is disposed on a second plane, the second plane vertically separated from the first plane.

14. The container of claim 13, wherein the second curved portion includes an upper portion proximate the intersection of the second curved portion and the plurality of sidewalls, the upper portion disposed on a third plane, the third plane substantially perpendicular to the plurality of sidewalls and vertically separated from the first plane and the second plane.

15. A container comprising:
   a sidewall extending in a substantially vertical direction, the sidewall terminating at a bottom plane;
   a bottom wall comprising:
      a first curved portion having a first radius of curvature with a first center of curvature located on a first side of the bottom wall; and
      a second curved portion terminating at the sidewall, the second curved portion having a second radius of curvature with a second center of curvature located on a second side of the bottom wall opposite the first side; and
   a reinforcing rib located on the second side of the bottom wall, the reinforcing rib having a bottom surface that is substantially coplanar with an outer surrounding portion of the bottom wall and separated from the bottom plane;
   wherein the first radius of curvature is greater than the second radius of curvature.

16. The container of claim 15, wherein the bottom wall further comprises:
   an inner portion; and
   an inner surrounding portion extending entirely around the inner portion and disposed on a first plane; and
   wherein the outer surrounding portion extends entirely around the inner surrounding portion and is disposed on a second plane, the second plane vertically separated from the first plane.

17. The container of claim 16, wherein an upper portion of the second curved portion is disposed on a third plane, the third plane substantially perpendicular to the sidewall and vertically separated from the first plane and the second plane.

18. The container of claim 15, wherein the sidewall forms a substantially circular perimeter.

19. The container of claim 15, wherein a top surface of the reinforcing rib intersects a bottom portion of the first curved portion and the second curved portion.

* * * * *